United States Patent
Chou et al.

(10) Patent No.: US 6,336,090 B1
(45) Date of Patent: Jan. 1, 2002

(54) AUTOMATIC SPEECH/SPEAKER RECOGNITION OVER DIGITAL WIRELESS CHANNELS

(75) Inventors: Wu Chou, Berkeley Heights; Michael Charles Recchione, Nutley; Qiru Zhou, Scotch Plains, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/201,082

(22) Filed: Nov. 30, 1998

(51) Int. Cl.[7] ............................................. G10L 15/02
(52) U.S. Cl. ...................... 704/231; 704/221; 704/243
(58) Field of Search ................................ 704/231, 243, 704/244, 221, 222

(56) References Cited

U.S. PATENT DOCUMENTS

| | | | |
|---|---|---|---|
| 5,909,662 A | * 6/1999 | Yamazaki et al. | 704/221 |
| 5,956,683 A | 9/1999 | Jacobs et al. | |
| 6,092,039 A | * 7/2000 | Zingher | 704/221 |

FOREIGN PATENT DOCUMENTS

| EP | WO 95 17746 A | 6/1995 |
|---|---|---|

OTHER PUBLICATIONS

ETSI—European Telecommunications Standards Institute, "European Digital Cellular Telecommunications System (Phase 2); Full rate Speech Transcoding, (GSM 06.10)," Sep. 1994.*

Paliwal, Kuldip K. and Bishnu S. Atal, "Efficient Vector quantization of LPC Parameters as 24 Bits/Frame," IEEE trans. Speech and Audio Proc., vol. 1, No. 1, Jan. 1993, pp. 3–14.*

Zinke, J. "Influence of Pattern Compression on speaker Verification," Eurospeech 93—3rd European Conf. on Speech Commun. and Technol., Berlin, Sep. 21–23, 1993, pp. 2267–2270.*

Gallardo–Antolin, A., F. Diaz–de–Maria, and F. Valverde–Albacete, "Recognition form GSM Digital Speech," ICSLP 98—5th Int. Conf. Spoken Language Proc., Sydney, Nov. 30–Dec. 4, 1998.*

European Search Report re EP 99 30 9326; Feb. 28, 2000, pp. 1–3 and Annex.

Gallardo–Antolin, A. et al, "Avoiding distortions due to speech coding and transmission erros in GSM ASR tasks," IEEE ICASSP, New York, 1999 (cited in above EPO Search Report).

(List continued on next page.)

*Primary Examiner*—William Korzuch
*Assistant Examiner*—Donald L. Storm
(74) *Attorney, Agent, or Firm*—William Ryan

(57) ABSTRACT

Automatic Speech Recognition (ASR) is achieved in wireless communications systems in which reliable ASR feature vector sequences are derived at a base station directly from digitally transmitted speech coder parameters, with no additional processing or signal modification required at the originating handset. No secondary channel need be provided for the transmission of ASR feature vectors. In operating on received speech coder parameters prior to conversion to a voice signal the present system and methods avoid the lossy conversion process and associated voice distortion. Since the received voice parameters are error protected during transmission they are received with greater accuracy.

All, or a subset, of speech coding parameters, including, in appropriate cases, spectral envelope parameters, reflection coefficients, LSPs, LSFs, LPCs, LPCCs, and weighted LPCCs may be processed at a receiving base station or forwarded to another location for processing.

16 Claims, 4 Drawing Sheets

FIG. 2

OTHER PUBLICATIONS

Lilly, B. T. et al, "Effect of speech coders on speech recognition peroformance," Proc. (IEEE) ICSLP 96, Philadelphia, Oct. 3–6, 1996, pp 2344–2347. (See EPO Search Report).

Euler, S. et al, "The influence of speech coding algorithms on automatic speech recognition," IEEE ICASSP 94, Adelaide, Australia, Apr. 19–22, 1994, pp. I/621–4. (See EPO Search Report above).

Castellano, P. J., et al, "Effects of speech coding on speaker verification," Electronics Letters, Mar. 14, 1996, vol. 32, No. 6, pp. 517–518.

Pythian, M., et al, "Effects of speech coding on text–dependent speaker recognition," IEEE TENCON 97, Brisbane, Australia, pp. 137–140, vol. 1. (See EPO Search Report above).

\* cited by examiner

AUTOMATIC SPEECH/SPEAKER RECOGNITION OVER DIGITAL WIRELESS CHANNELS

FIELD OF THE INVENTION

The present invention relates to Automatic Speech/Speaker Recognition (ASR) and, more particularly, ASR over wireless communications channels.

BACKGROUND OF THE INVENTION

Automatic Speech/Speaker Recognition (ASR) has become ever more prevalent with improvements in hardware, modeling and recognition algorithms. Among many important applications of ASR technology are those in the telephone and other communications arts. For example, the use of ASR has proven valuable in providing directory assistance, automatic calling and other voice telephony applications over wire circuits. In a parallel area of development, the use of cellular systems, personal communications systems (PCS) and other wireless systems (collectively referred to as "wireless" in the sequel) has continued to proliferate. It is natural, therefore, to seek to apply improvements in ASR achieved in wired systems to wireless systems as well.

ASR over wireless channels is problematic because of the additional noise and distortion introduced into voice signals during the coding, transmission (e.g., due to fading or packet loss), and decoding stages. Noise-degraded voice signals present in wireless environments are often substantially different from the original voice signal, leading to degradation in ASR performances when standard ASR techniques arc applied. This problem has become acute as attempts to create advanced ASR-based services, such as intelligent agent services or large vocabulary speech recognition services over digital wireless channels. Previous approaches have mainly focused on noise reduction techniques, but the results are far from ideal and of limited applicability because of the many variations in wireless environments (e.g. TDMA, CDMA, (GSM, etc.).

Recent studies found that if the feature vectors for ASR purpose can be extracted at the handset and transmitted digitally through a secondary digital channel, there is almost no performance degradation on the ASR performance in the wireless environment as compared to the wired telephone network. A typical prior art dual channel system is illustrated in FIG. 1. There, a cellular handset 101 is employed by a mobile user to encode normal speech and transmit the coded signal, including relevant coder parameters, through primary (voice) channel 105 to cellular base station 120. Base station 120 then decodes the received coded signal to produce a voice output suitable for communication over the public switched telephone network (PSTN), or other voice communications network as represented by public switch 130 and its output to a network. FIG. 1 also shows the generation at the cellular handset 101 of a second set of signals corresponding to the ASR parameters to be used by an ASR application. This second set of signals is transmitted over a second digital channel 110 to cellular base station 120, where they are forwarded to ASR system 140.

The experimental use of systems of the type shown in FIG. 1 have generated interest in creating a standard ASR feature set which can be extracted at the handset and sent through a wireless network as a digital signal using a secondary digital link. Since the bit rate for ASR feature vector transmission can be quite low (<4 Kb/s), it is possible to use a secondary digital link such as that proposed for inclusion in new wireless standards such as IS-134. Although this secondary channel solution seems promising, it has a number of serious drawbacks. In particular this approach requires:

1. A new standard and major changes in communication protocols. Even so, incompatibilities with many current wireless communication standards would require modifications or abandonment of existing standards-compliant network equipment.
2. Extra bandwidth to transmit ASR feature vectors from the handset to the base-station. Synchronizing the primary digital channel for the transmission of voice and the secondary digital channel for the transmission of the extracted ASR feature vectors can also be a serious problem.
3. Major changes to current handsets.
4. A variety of dual-channel solutions. That is, dependence on particular present wireless standards or formats (CDMA, TDMA, GSM, IS-94, IS-134, etc.) and associated signaling and modulation schemes, make a universal solution impractical for all available standards.
5. High initial investment to introduce services based on this technique.

SUMMARY OF THE INVENTION

The limitations of the prior art are overcome and a technical advance is achieved in systems and methods for efficiently and economically enabling ASR capabilities in wireless contexts as described below in connection with illustrative embodiments.

Thus, in accordance with one aspect of the present invention, reliable ASR feature vector sequences are derived at a base station (or other network or system unit) directly from the digitally transmitted speech coder parameters. In many applications the ASR functions are performed at a public switch or elsewhere in a network. With this approach, a novel ASR feature extractor operates on the received speech coder parameters from the handset with no additional processing or signal modification required at the handset. Thus, speech coder parameters received at a base station are used not only for reproducing the voice signal, as at present, but also for generating the feature vector sequence for ASR applications.

An illustrative ASR feature vector extractor at the base-station in operating on digitally transmitted speech coder parameters prior to conversion of these coder parameters back to a voice signal avoids the lossy conversion process and associated voice distortion. In using embodiments of the present invention, there is no need to modify wireless handsets, since the ASR feature vectors are derived from the same set of speech coder parameters ordinarily extracted at the handset. Therefore, existing handsets provide a front end for the ASR feature vector extractor at the base station.

Moreover, the connection from the handset to the base station in digital wireless environments is all-digital and includes error protection for data signals communicated to a base station. Therefore, the transmission from the handset to the present inventive feature extractor at a base-station or other location has the same digital transmission quality as in secondary channel schemes.

Although speech coder parameters are very different from the feature vectors needed for ASR purposes, the present invention provides illustrative techniques for realizing a speech feature extractor based on normal speech coder parameters. Further, in accordance with another aspect of the present invention, perfect synchronization of the (decoded) voice signal and the ASR feature vector signal is provided without additional signal synchronization bits. This is possible, as disclosed in illustrative embodiments of the present invention, because both the voice signal and ASR feature vector signal are generated from the same speech coder parameters.

Overall, the present invention provides systems and methods for enhanced ASR with no need for a secondary channel and no major changes to current wireless standards. Changes, extensions and operational differences at base stations are also minimal. Advantageously, the digital channel for ASR applications is created (through modifications to software) as a second destination for a voice call.

Alternative embodiments perform the ASR feature extraction and ASR functions at a switch connected (directly or through network connections) to the receiving base station. In yet other embodiments the coded speech signals received at a base station from the transmitting handset are forwarded (with or without decoded speech signals) to a network location, including a terminal or storage system.

DETAILED DESCRIPTION

Figure 1:
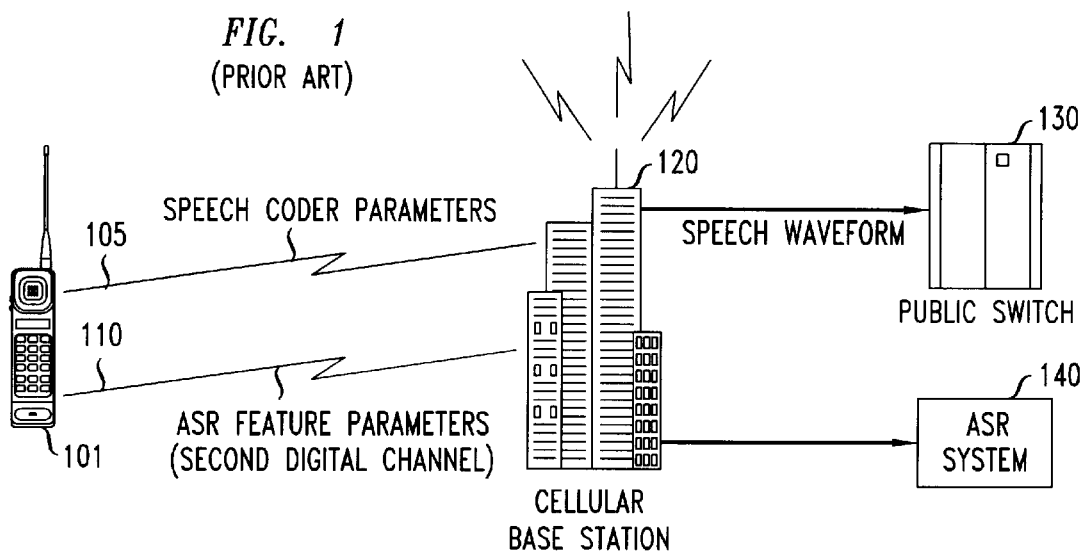
FIG. 1 shows a prior art system using a secondary digital channel to transmit ASR parameters to a base station for subsequent use by an ASR system.
Figure 2:
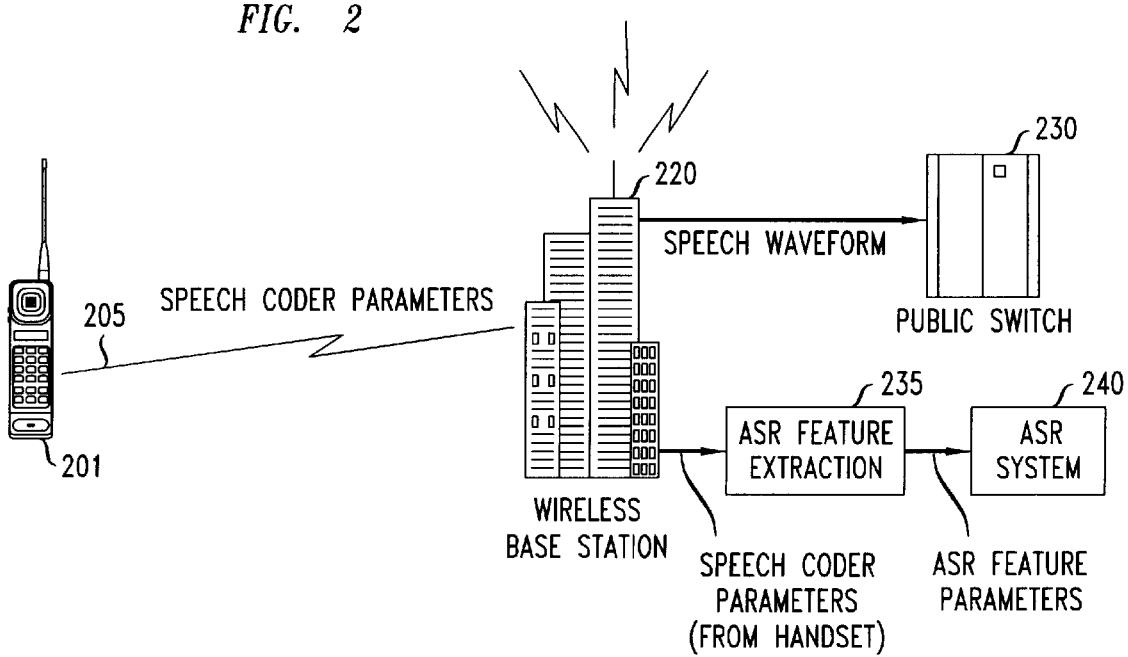
FIG. 2 shows an overall system representation of an illustrative single-channel embodiment of the present invention.

FIG. 2 shows an illustrative system embodiment of the present invention. In FIG. 2, a handset 201 is shown generating speech coder parameters for transmission to wireless base station 220 in response to spoken user inputs. The coded speech signals sent on transmission channel 205 are identical (for the same spoken input) in every way to coded speech signals used for voice communications in normal (non-ASR) use of the wireless system of FIG. 2. In addition, these coded speech signals are of the same type as those transmitted on the voice channel 105 in the system in FIG. 1. No secondary digital channel is required to carry a set of ASR-related parameters, as in the system of FIG. 1. Rather, at wireless base station 220, the received coded voice signals are, on the one hand, provided on path 222 for delivery to public switch 230, as in normal performance of the wireless system (and in the system of FIG. 1). Normally, decoding of the handset-coded speech signals is accomplished at a switch such as public switch 230, but such decoding to speech signals can occur at base station 120 or, via switch 230 and path 231, elsewhere in the PSTN (or other) network.

In addition, the coded voice signals received at wireless base station 220 are provided to ASR feature extraction system 235 and ASR system 240, illustratively located at base station 220. There, the same coded representations that are decoded to produce voice signals are, instead used to extract ASR feature parameters in ASR feature extraction unit 235 for use by ASR systems such as 240. The speech coder parameters received from handset 205 are also illustratively provided on lead 225 to public switch 230, where they are alternatively (or additionally) available for delivery as digital signals to feature extraction and ASR units at switch 230 or elsewhere in a network. The connection from base station 220 to ASR feature extraction system 235 and thence to ASR system 240 is for some applications advantageously arranged to be a separate switch connection, such as is used to connect the normal voice path to public switch 230. In other applications it proves convenient to have the coded parameters sent by the same path to a switch 230, where feature extraction (and ASR) are performed in addition to speech decoding.

Thus, base station 220 will, in one typical application of the present inventive principles, provide the coded speech parameters directly to ASR feature extraction unit 235 and ASR system 240. Alternatively, the path to ASR feature extractor 235 and/or ASR system 240 may be maintained at switch 230 or other centralized facility for application of the recognized speech. For example, the recognized speech may be used for authentication of the speaker, or for command or other inputs to a text-responsive system. One application for such recognized speech is the transfer of a text version of the speech to a responsive system, e.g. for speaker-machine interaction, though numerous and varied other applications of speech recognition are known in the art. The manner of conversion of standard voice coded signals to produce ASR feature parameters will be described in more detail below.

One useful characteristic of digital wireless environments is that a user's speech, after conversion into a sequence of digital coder parameters at the handset, is advantageously error protected by channel coding techniques during the transmission through the wireless medium. This channel coding is typically applied unequally to different parts of the transmission. That is, it is common to have the most important coder parameters transmitted with more complete protection, while less important parameters are less fully protected. Among these most important parameters are those relating to signal synchronization and the spectral shape of the voice signals.

Then, though channel fading and interference may cause the loss of certain coder parameters and distort the reproduced voice signal, it is usually true that the most important coder parameters are preserved because of this additional error protection afforded them in channel coding. So, in accordance with another aspect of the present invention, ASR feature vector signals are advantageously extracted from these better-protected speech coder parameters. As a result, information for ASR feature extraction is received digitally and with high reliability using, only the channel coding scheme normally used to protect original speech coder parameters.

In accordance with another aspect of the present invention, ASR feature extraction is advantageously accomplished from the speech coder parameters before they are converted back to voice signals. One reason for this is that the converted voice signal is distorted in the decoding process. Even without channel effects, the segmental-signal-to-quantization-noise-ratio (SSNR) of the decoded voice is often only approximately 20 dB in typical wireless environments. See, for example, B. S. Atal. V. Cuperman and A. Gersho "Advances in Speech Coding" *Kluwer Academic Publisher*. This latter signal condition arises because in seeking to meet low-bit-rate constraints, many features, e.g., excitation signals, are not adequately coded and represented. In addition, channel fading and interference cause many speech coder parameters to be unreliable for high-quality conversion back to voice signals.

Another advantage derived from using coding parameters as the basis for ASR feature extraction is that the converted voice signal is normally a synthesized voice signal. Thus, the converted voice signal has a heavy dependency on the particular coding scheme used in the speech coder. Most importantly, the synthesized speech from the speech coder is usually very different from the human speech used to establish the speech recognition model; typically many characteristics of a speaker's voice are altered or lost in the synthesis process.

From the foregoing it should be clear that the design and operation of an ASR feature extractor based directly on digitally transmitted coder parameters provides important advantages in illustrative embodiments of the present invention. Accordingly, present illustrative inventive designs advantageously identify and select a set of parameters from current speech coder parameters from which reliable ASR feature vectors can be derived. A design of an illustrative feature extractor will now be described.

Speech coders typically used in wireless environments vary in many respects from one system to another. See, for example, R. Steele, "Speech codecs for Personal Communications," *IEEE Communications Magazine*, November 1993, pp. 76–83. Nevertheless, many of the most widely used coders use analysis-by-synthesis techniques described, for example in J. Flanagan "Speech Analysis, Synthesis and Reproduction" Springer-Verlag. Moreover, these coders typically use linear predicative coding (LPC) analysis to characterize the spectral shape of windowed speech frames. Examples of these LPC-based coders include several variants of the well-known CELP techniques.

Despite some overall similarities of commonly used coders, there are often significant differences in coders for various wireless applications. For example, the order of the analysis filter A(z) and parametric representations for speech signals typically vary from coder to coder. In particular, such analysis filters are typically characterized by various sets of parameters, including reflection coefficients, log-area ratio coefficients, line spectral pairs (LSPs) and line spectrum frequencies (LSFs), among others. Although no speech coder transmits autocoirelation coefficients directly (because they are very sensitive to errors), all parametric representations of analysis filters used by current speech coders in wireless environment can be transformed to autocorrelation coefficients through well-known transformations. See, for example, K. Feher. editor "Advanced Digital Communication" Prentice-Hall. Transformation of coder parameters related to analysis filter A(z) to their autocorrelation coefficients is advantageously employed in illustrative embodiments of the proposed invention.

Autocorrelation coefficients carry salient information from which the most widely used ASR feature parameters, LPC cepstial coefficients, can be derived. See, for example, L. Rabiner and B.-H. Juang *Fundamentals of Speech Recognition*, Prentice-Hall, 1993. Moreover, the order of the LPC analysis in speech coders is often higher than the order of the LPC analysis needed for typical ASR applications. This is because in speech coding the shape of the spectral envelope must be tracked closely in order to accurately reproduce the voice waveform. In contrast, the minor details of the spectral envelope have little value in ASR. Since the lower order autocorrelation coefficients are always part of the autocorrelation coefficients obtained from higher order LPC analysis characteristic of wireless coders, they can always be extracted from the speech coder parameters.

Figure 3:
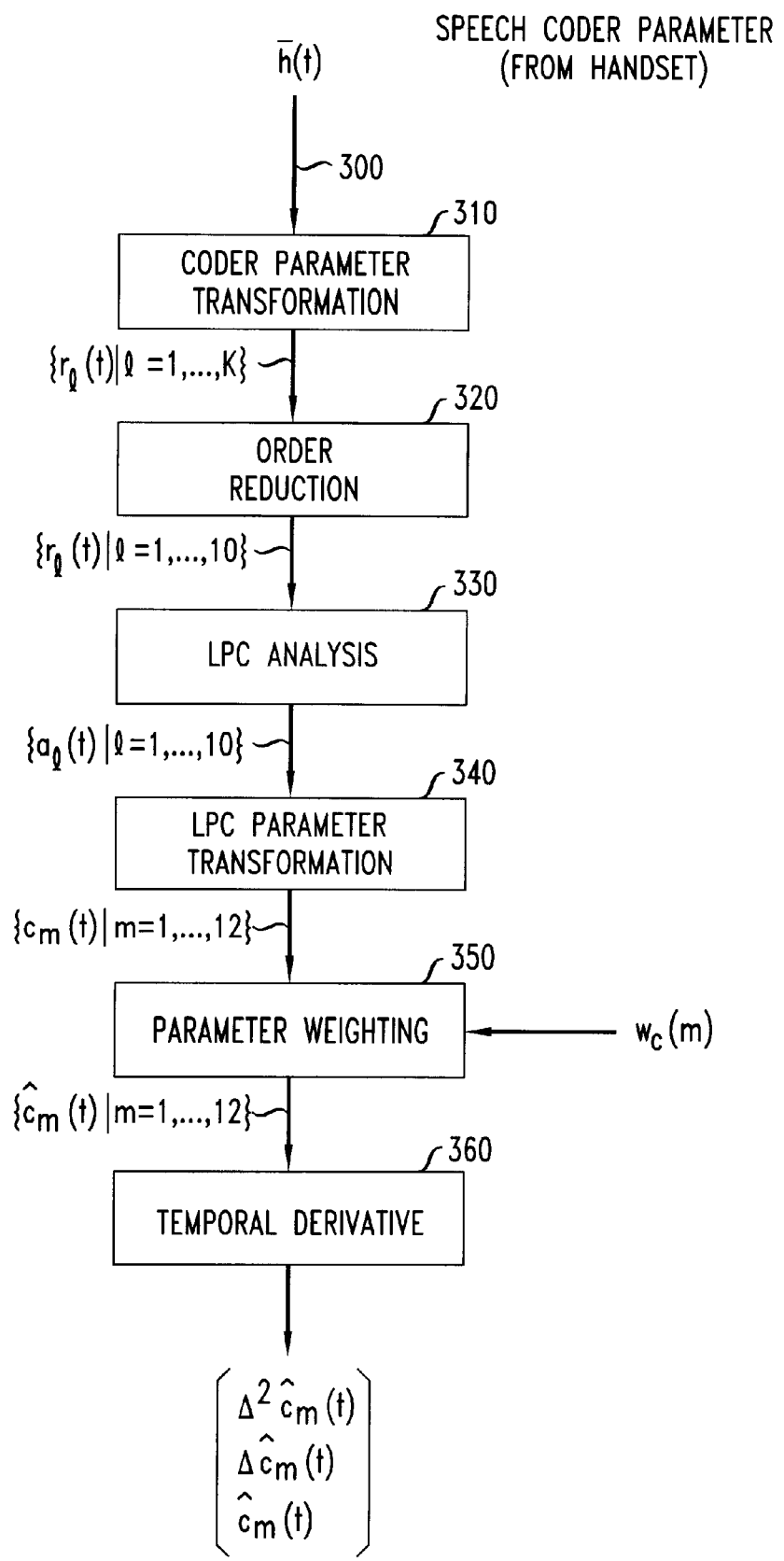
FIG. 3 shows illustrative processing steps useful in converting coded voice signals received at a base station to ASR feature parameters.

FIG. 3 depicts operations performed in an illustrative ASR feature extractor (such as 235 in FIG. 1). As shown in FIG. 3, the coder parameters are retrieved from the handset-to-base-station transmission and applied as input 300 in FIG. 3. These received speech coder parameters are typically provided in sets for contiguous speech intervals, each of 10–20 msec duration. These received sets of coder parameters are first processed to retrieve the parameters related to the analysis filter from the larger set of received parameter values.

The selected coder parameter set is further transformed at step 310 into auto correlation coefficients by means of an appropriate transformation implemented in the feature extractor. One particular example is given below for the illustrative case of the IS-127 CDMA wireless standard. After transformation to autocorrelation coefficients $\{r_f(t)|l= 0, 1, \ldots, K\}$, order reduction is performed on the autocorrelation coefficients, and the lower order autocorrelation coefficients $\{r_f(t)|l=0, 1 \ldots, 10\}$ are extracted at step 320 for the purpose of generating ASR feature vectors.

The lower order autocorrelation coefficients $r_f(t)$ are then processed at step 330 in FIG. 3 to converted them into linear predicative coding coefficients $\bar{a}(t)=\{a_l(t)|l=0, 1, \ldots, 10\}$. It proves convenient in many cases to perform this latter conversion using the well-known Levison-Durbin recursion algorithm described, for example, in L. Rabiner and B-H Juang, *Fundamentals of Speech Recognition*, Prentice-Hall, 1993. The LPC coefficients $\bar{a}(t)$ that are output from step 330 are then transformed at step 340 to LPC cepstral coefficients $\bar{c}(t)=(c_1(t), c_2(t), \ldots c_{12}(t))$. These LPC cepstral coefficients advantageously provide the basis of ASR feature vectors, as is well known in the art. In typical operation, the LPC cepstral coefficients arc then weighted at step 350 in FIG. 3 by weights $w_c(m)$ and used to form $\bar{c}$, an illustrative 39-parameter ASR feature set $\{\hat{c}=<\hat{c}, \Delta\hat{c}, \Delta\Delta\hat{c}, \Delta e, \Delta\Delta e, e>\}$, where $\Delta$ and $\Delta\Delta$ are first and second order difference operators, and e is the normalized energy generated from $r_0(t)$ the 0-th order autocorrelation coefficient.

Figure 4:
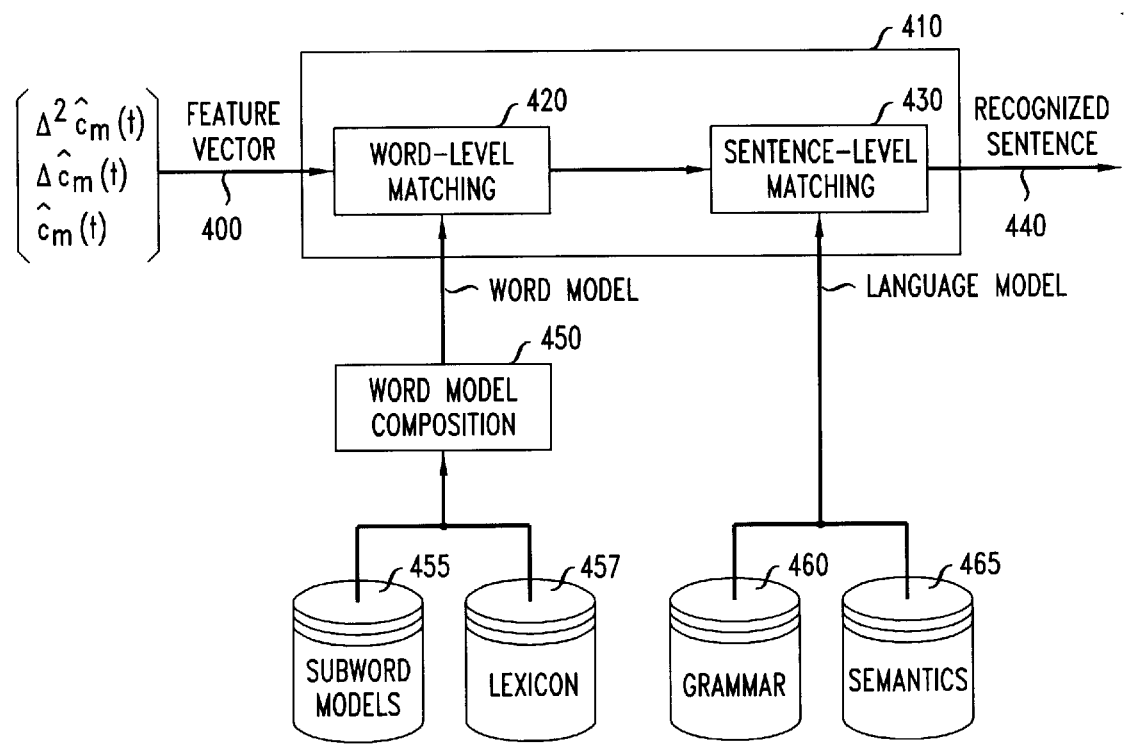
FIG. 4 shows an illustrative ASR system operating on ASR feature parameters of the illustrative processing shown in FIG. 3.

FIG. 4 shows a typical speech recognition system (240 in FIG. 2) that receives the output feature vector c from a features extractor (e.g., 235 in FIG. 2, and FIG. 3) on input 400.

The illustrative ASR system of FIG. 4 employs subword models represented by 455 in FIG. 4 for use in connection with lexicon information stored in lexicon store 457. The subword models are based on phone-like units and are typically built using training data collected from speakers. The subword models are concatenated to form models for words in a lexicon provided from a dictionary or other known source. When subword units are selected corresponding to a complete set of phonemes in English, the subword model set can model any given words in English. The combination of these modeling sources is illustrated in FIG. 4 by word model composition block 450. The word models provided by composition block 450 are then processed in accordance with well-known hidden Markov models (HMMs) techniques described, for example, in the above-cited Rabinier and Juuag reference. The grammar language model 460 and semantics model 465 shown in FIG. 4 can be used to constrain the searches performed in such HMM processing. Typically, the best word sequence is obtained in the system of FIG. 4 by using a Viterbi decoding process based on all knowledge sources, while using ASR speech feature vector sequences from the ASR feature vector extractor 235 in FIG. 2.

Example of Conversion of Speech Coder Parameters to Correlation Coefficients

This section presents an illustrative process, including pseudocode listings, for the converstion of speech coder parameters received at a feature extractor (such as 235 in FIG. 2) to correlation coefficients useful in constructing the feature vectors for input to an ASR system (such as 240 in FIG. 2 and in FIG. 4).

As noted above, speech coding algorithms standardized for use in digital wireless telecommunication systems operate on digitally sampled audio waveforms. The sampled waveforms are processed in discrete time intervals (frames), and the speech encoder at the transmitting side of the communications link uses a number of operations to determine the values for a set of parameters that would best describe the audio waveform in the frame being processed. These parameters are encoded, often in the form of an index to a table or codebook, and transmitted over the air interface to the receiver. The speech decoder at the receiver possesses the same codebooks as the encoder at the transmitter, and performs a series of operations using the encoded parameters in order to generate an approximation to the original waveform that was presented to the encoder at the transmitter.

Many of the speech coders currently standardized for use in digital wireless communications systems are based on the Code Excited Linear Prediction (CELP) model. Among the parameters transmitted by these coders is a set of values that describes the spectral envelope of the audio waveform in the frame being processed. These parameters may be represented in a number of different ways including (but not limited to) linear predictor coefficients (LPCs), reflection coefficients, line spectral pairs (LSPs) and line spectral frequencies (LSFs). These parameters can be used to generate correlation coefficients for use as input to an automatic speech recognition (ASR) system. The following example illustrates how this transformation can be accomplished for the Enhanced Variable Rate Coder (EVRC), published in North America as IS-127 by the Telecommunications Industry Association (TIA) and currently standardized for use with IS-95x compliant Code Division Multiple Access (CDMA) communications systems. The techniques described are equally applicable to any speech coding algorithm based on the CELP model or on any form of linear predictive coding (LPC).

Figure 6A:
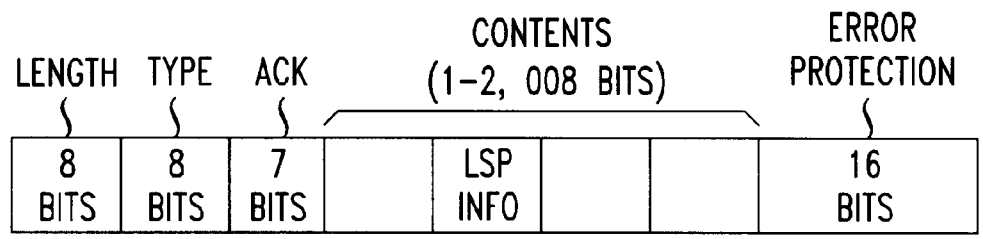
FIG. 6A shows an illustrative traffic message format including LSP information and error protection bits.
Figure 6B:
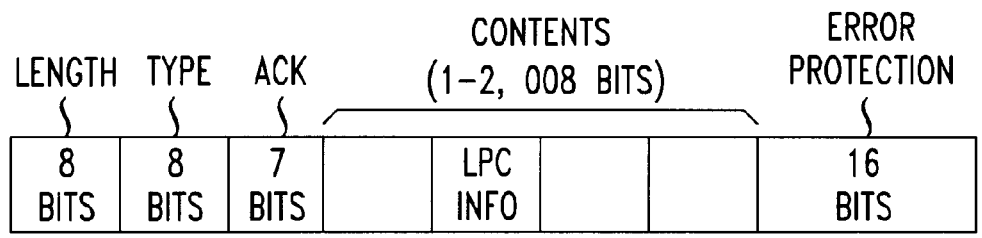
FIG. 6B shows an illustrative traffic message format including LPC information and error protection bits.
Figure 6C:
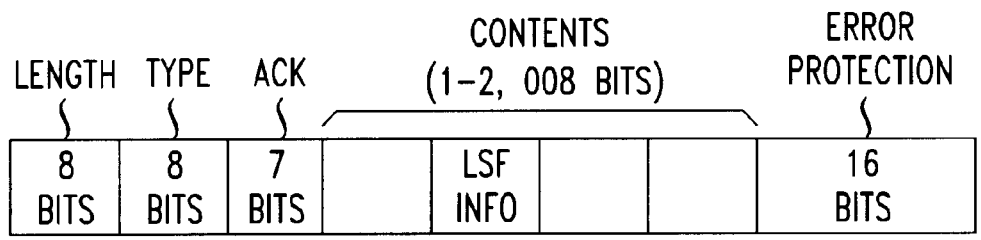
FIG. 6C shows an illustrative traffic message format including LSF information and error protection bits.

FIGS. 6A, 6B and 6C shows illustrative traffic message formats and including error protection bits and LSP, LPC and LSF information, respectively. Such formats are illustrated, for example, in D. J. Goodman, *Wireless Personal Communications Systems*, Addison-Wesley, Reading, Mass, 1997.

In the particular case of an IS-127 Enhanced Variable Rate Coder, the coding algorithm operates on digitally sampled audio waveforms in 20 msec intervals (frames) to generate and transmit a set of parameters that describes the waveform for the frame being processed. The transmitted parameters include codes that represent the values of the LSPs for the frame. The LSP codes comprise a set of three codebook indices, each of which identifies a particular set of LSP values included in one of the three LSP codebooks maintained by both the speech encoder and speech decoder. These LSP codes are translated to a vector of ten LSPs, which are then converted to LPCs for use in the decoder's synthesis filter. Beginning with the LPCs, the process of generating correlation coefficients can be accomplished in a number of ways. One way is to first convert the LPCs to reflection coefficients (RCs), and then to convert the RCs to autocorrelation coefficients (CCs).

Figure 5:
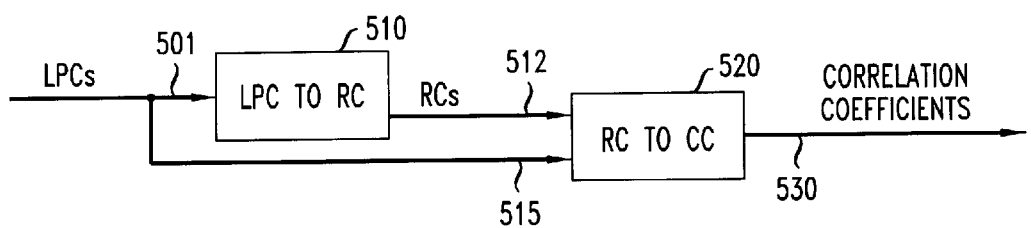
FIG. 5 is a block diagram useful in understanding the conversion of LPC values to correlation coefficients in accordance with one aspect of the illustrative process of FIG. 3.

FIG. 5 is a block diagram of functions performed in this illustrative process. Thus, input LPCs are received at 501 and applied to the LPC-to-RC functional block 510. The input LPCs are also applied to the RC-to-CC functional block over path 515. This latter input and the output of block 510 are used in block 520 to generate the desired correlation coefficients on output path 530.

Particulars of the LPC-to-RC transformation are illustrated in the following pseudocode segment.

```
/* copy input array of LPCs to a temporary array for
    processing */
for(i=1; i<=LPC₁₃ ORDER; i=i+1)
{
aa[i]=1pc[i];
}
/* convert LPCs to RCs */
for(i=LPC_ORDER; i>0; i=i-1;)
    tmp=1.0-aa[i]* aa[i];
    for(j=0; j<i; j=j+1)
    {
        temp[j]=aa[i-j];
    }
    for(j=0; j<i; j=j+1)
    {
        aa[j]=(aa[j]-aa[I]* tempt[j])/tmp;
        rc[i-1]=aa[i];
    }
}
```

Note that the constant $LPC_{13}ORDER$ is nominally equal to 10 for the IS-127 speech coder, though other particular values can be used as circumstances might dictate. Also, tmp is a temporary variable and temp is a temporary array of dimension LPC_ORDER. The array lpc of dimension LPC_ORDER is an input to this transformation, and contains the LPCs calculated by the IS-127 speech decoder. The array rc of dimension LPC_ORDER is the output of the transformation and contains the RCs.

The conversion from RCs to CCs is illustrated in the following pseudocode segment:

```
/* create a dummy array of LPCs */
dummy[0]=1.0;
for(i=1; i<=LPC_ORDER; i=i+1)
    dummy[i]=lpc[i-1];
/* perform conversion recursion */
dummy[1]=rc[0];
cc[0]=1.0;
cc[1]=-rc[0];
for(i=1; i<=LPC_ORDER-1; i=i+1)
{
    dummy[i+1]=rc[i];
    for(j=0; j<i/2; j=j+1)
```

```
{
    tmp=dummy[j+1];
    dummy[j+1]=dummy[j+1]+rc[i]* dummy[i-j];
    dummy[i-j]=dummy[i-j]+rc[i]* tmp;
}
if(i modulo 2==1)/* if i is an odd number */
    dummy[j+1]=dummy[j+1]+rc[i]* dummy[j+1];
cc[i+1]=-rc[i];
for(j=0; j<=i-1; j=j+1)
    cc[i+1]=cc[i+1]-dummy[j+1] cc[i-j];
}
```

In this example, LPC_ORDER is a constant whose value is again nominally 10 for IS-127, tmp is a temporary variable, dummy is temporary array of dimension LPC_ORDER+1. The inputs to the transformation are the arrays lpc and rc, both of dimension LPC_ORDER+1, that contain the LPCs and RCs, respectively. The output of the transformation is the array cc, also of dimension LPC_ORDER+1, that contains the correlation coefficients to be used by the ASR system.

Note that the LPCs are generated internally by the IS-127 decoder; the operations to calculate and output CCs described above are advantageously inserted into the decoder at the point immediately after the LPC calculation.

Though the above-described embodiments have emphasized CELP-based coders commonly used today, no such limitation is essential to the present invention. A variety of coding techniques advantageously provide error-protected (and other high-reliability) received speech coding parameters from which useful ASR feature vectors can be derived, as taught in the present disclosure.

While the illustrative ASR system shown in FIG. 4 employs particular modeling and processing steps and functions, none of these are essential to the broader aspects of the present invention. Other particular speech recognizers will be applied by those skilled in the art and appropriate feature information will be extracted from received signals in the manner described above, and in modifications and extensions thereof—all as will be clear to those skilled in the art in light of the present disclosure.

Further, while automatic speech recognition (ASR) processing has been emphasized, those skilled in the art will recognize that speaker recognition and authentication will also be advantageously performed using the inventive principles described herein. Useful adaptations and modifications of the present teachings for embodiments employing such additional or alternative functionality are well-known in the art. Thus, for example, for authentication of particular speakers, information about the speech characteristics of such speakers will be stored or otherwise made available for use in the speech models employed.

The feature extraction and/or ASR units can be located a the receiving base station, the switch connected to the base station (or another network switch connected through that first switch), or at another location connected on the network (s) to which these elements are connected. The digital coded handset signals can be communicated to any convenient location for feature extraction and ASR operations. In some cases it will be convenient to have the feature extraction and ASR operations performed at different locations.

Numerous and varied applications and extensions, all within the spirit and scope of the present invention, will occur to those skilled in the art.

What is claimed is:

1. A method for automatically recognizing speech received as coded speech signals in a first set of signals received from a wireless transmission channel comprising the steps of extracting a plurality of speech feature signals from said received coded speech signals separately from any conversion of said received coded speech signals to audio speech signals, and applying said plurality of speech feature signals to a speech recognition system, wherein said received coded speech signals comprise a plurality of coded speech parameters and said extracting comprises selecting a subset of said received coded speech parameters, and converting said subset of said received coded speech parameters to said plurality of speech feature signals.

2. The method of claim 1, wherein said first set of received signals further comprises error protection signals for improving the reliability of said received coded speech signals.

3. The method of claim 1, wherein said received coded speech parameters comprise a plurality of coded speech spectral envelope parameters for said speech, and wherein said selecting of a subset of said received coded speech parameters comprises selecting a subset of said coded speech spectral envelope parameters.

4. The method of claim 3 wherein said subset of coded speech spectral envelope parameters comprises a plurality of reflection coefficients.

5. The method of claim 3 wherein said subset of coded speech spectral envelope parameters comprises a plurality of line spectral pairs (LSPs).

6. The method of claim 3 wherein said subset of coded speech spectral envelope parameters comprises a plurality of line spectral frequencies (LSFs).

7. The method of claim 3 wherein said converting further compises the step of generating from said subset of coded speech spectral envelope parameters a set of linear predictive coding (LPC) parameters.

8. The method of claim 7 wherein said converting further compises the step of transforming said set of LPC parameters to a corresponding set of ILPC cepstral coefficients.

9. The method of claim 8 wherein said converting further compises the steps of weighting said set of LPC cepstral coefficients to produce a set of weighted LPC cepstral coefficients, and deriving said plurality of speech feature signals from said weighted LPC cepstral coefficients.

10. The method of claim 1 wherein said extraction and applying are performed at a base station.

11. The method of claim 1 wherein said first set of signals is received at a base station and forwarded to a second location for said extraction and applying.

12. A system for automatically recognizing speech received as coded speech signals in a first set of signals received from a wireless transmission channel comprising means for extracting a plurality of speech feature signals from said received coded speech signals separately from any conversion of said received coded speech signals to audio speech signals, and means for applying said plurality of speech feature signals to a speech recognition system, wherein said received coded speech signals comprise a plurality of coded speech parameters, and said means for extracting comprises means for selecting a subset of said received coded speech parameters, and means for converting said subset of said received coded speech parameters to said plurality of speech feature signals.

13. The system of claim 12 wherein said received coded speech parameters comprise a plurality of coded speech spectral envelope parameters for said speech, and wherein said means for selecting a subset of said received coded speech parameters comprises means for selecting a subset of said coded speech spectral envelope parameters.

14. The system of claim 13 wherein said subset of said coded speech spectral envelope parameters are parameters of relatively higher reliability by reason of having been protected to a relatively higher degree by error protection means prior to said receiving.

15. The system of claim 12 wherein said first set of signals is received at a base station and said means for extracting and means for applying are located at said base station.

16. The system of claim 12 wherein said first set of signals is received at a base station and said system further comprises means for forwarding said first set of signals to a second location for said extraction and applying.

* * * * *